No. 715,654. Patented Dec. 9, 1902.

A. M. FRIEND.
GRAVITY ELECTRIC BATTERY.
(Application filed June 8, 1901.)

(No Model.)

WITNESSES:

INVENTOR.
Adam M. Friend
BY
ATTORNEY.

UNITED STATES PATENT OFFICE.

ADAM M. FRIEND, OF DENVER, COLORADO.

GRAVITY ELECTRIC BATTERY.

SPECIFICATION forming part of Letters Patent No. 715,654, dated December 9, 1902.

Application filed June 8, 1901. Serial No. 63,787. (No model.)

*To all whom it may concern:*

Be it known that I, ADAM M. FRIEND, a citizen of the United States of America, residing at Denver, in the county of Arapahoe and State of Colorado, have invented certain new and useful Improvements in Gravity Electric Batteries; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in gravity electric batteries of the class which by reason of their use or the service required must of necessity be inactive much of the time.

My objects are to obviate local or internal neutralization, to reduce to a minimum the care required to keep the battery in working order by making it practically automatic, and, further, to provide a battery which does not depend upon continuous activity for its efficiency, but which will produce equally good results during the active intervals, though idle the greater portion of the time. To these ends I divide the cell horizontally into two compartments, containing, respectively, the positive and negative elements of the battery, by a partition adapted to prevent the solid particles of matter from passing from one element to the other, but at the same time permitting the proper and necessary communication between the positive and negative compartments to subserve the best results or produce the maximum efficiency. The separating partition or disk may consist of pasteboard or other suitable material possessing the absorbent or porous property or forming a filter against the passage of solid particles.

The invention will now be set forth more in detail, reference being made to the accompanying drawings, in which is illustrated an embodiment thereof.

Figure 1:
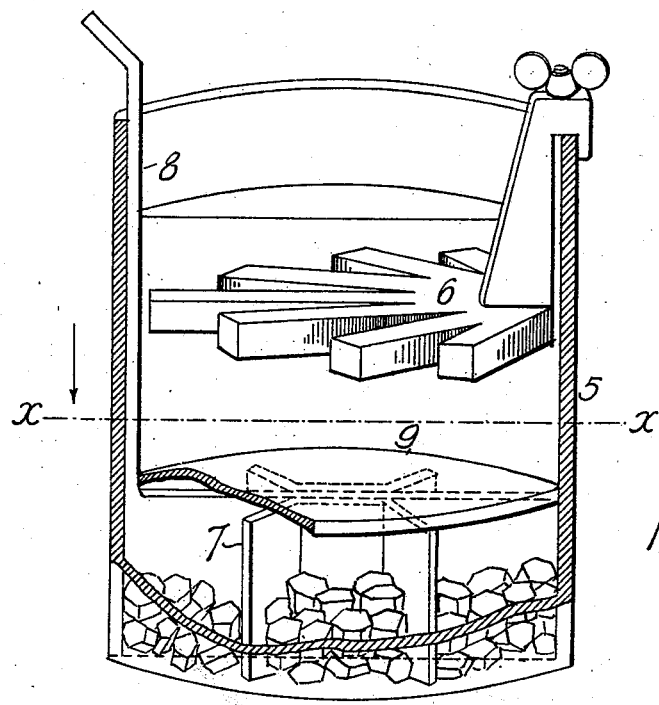
Figure 2:
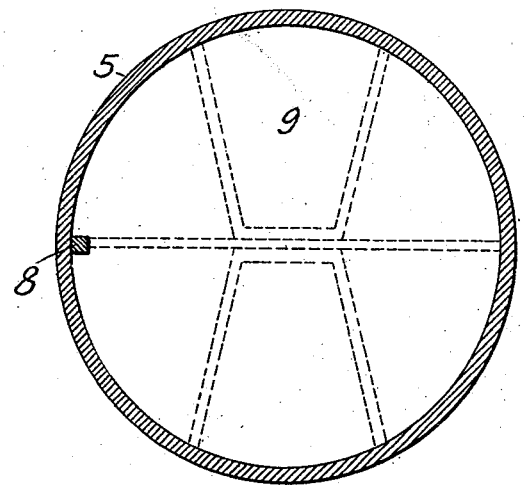

In the drawings, Figure 1 is a perspective view, partly in section, illustrating a jar or gravity-battery cell equipped with my improvement. Fig. 2 is a horizontal section taken through the same on the line $xx$, Fig. 1.

Similar reference characters indicating corresponding parts in the views, let the numeral 5 designate the jar; 6, the positive or zinc element; 7, the negative or copper element, and 8 the return-wire connected with the copper element. Between the two elements is placed the absorbent or porous partition 9, which is fitted closely into the jar, being of a size equal to the entire internal cross-sectional area of the cell. The partition is of such consistency that it will be indented by the wire 8 and form a close fit therearound.

The disk or partition 9 may remain stationary or float in the jar, as circumstances require.

Prior to use the porous or absorbent partition or disk must be soaked to saturation in sulfate of copper. When once saturated in the sulfate of copper, it becomes too heavy to float through the sulfate of zinc, yet it will hold its position on the surface of the copper sulfate.

Care should be taken that the wire 8 is straight and placed close to the wall of the jar, as shown in Fig. 1. After the copper and blue vitriol have been placed in the jar the latter should be supplied with old battery solution or hot water to a level a short distance above the vitriol. The saturated disk 9 is then put in place, after which the zinc is put in the jar. The jar should be supplied with water, preferably hot, to a level above the zinc, after which a layer of mineral seal oil or kerosene should be poured upon the water. This battery should need no further attention until the blue vitriol is consumed, after which the operation of renewing and cleaning the battery is very simple and need not be given in this connection.

Having thus described my invention, what I claim is—

1. The combination with a gravity-battery, of a partition placed horizontally in the jar between the positive and negative elements, and fitting its sides to prevent communication between the two compartments around the disk, but permitting vertical movement of the disk in the jar for the purpose set forth, the said partition being porous and forming a strainer or filter to permit the passage of liquid while straining out the solid
5 particles of matter.

2. The combination with a gravity-battery, of a partition horizontally disposed in the jar between the positive and negative elements, fitting the sides of the jar closely and closing the circular cross-sectional area of the jar, 10 the said partition being porous and forming a filter for the purpose set forth.

In testimony whereof I affix my signature in presence of two witnesses.

ADAM M. FRIEND.

Witnesses:
 FRANK B. ANGELL,
 L. E. McPHERSON.